T. CRANEY.
APPARATUS FOR THE PRODUCTION OF VALUABLE PRODUCTS FROM REFUSE ORGANIC MATTER.
APPLICATION FILED JUNE 28, 1913.
1,140,502.
Patented May 25, 1915.
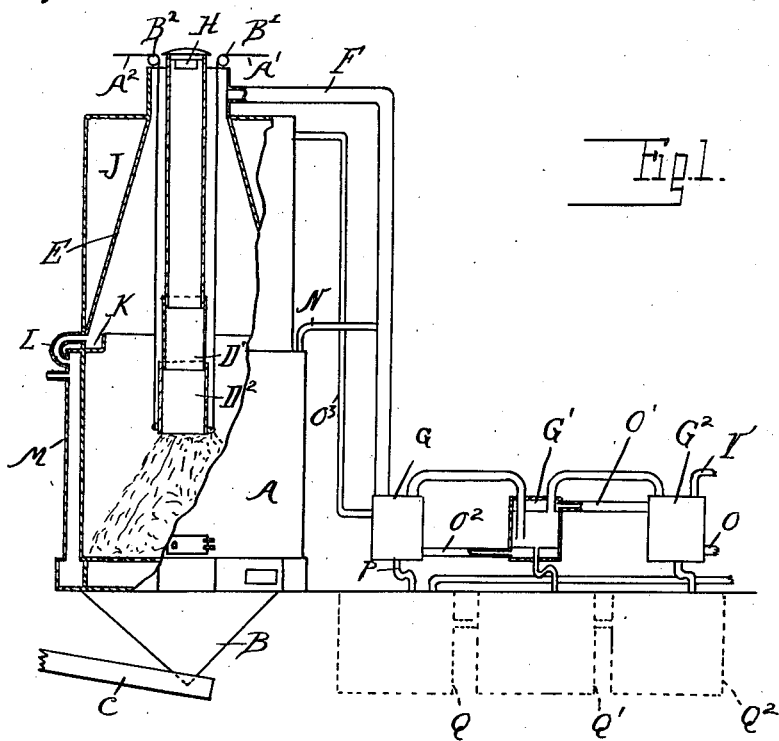
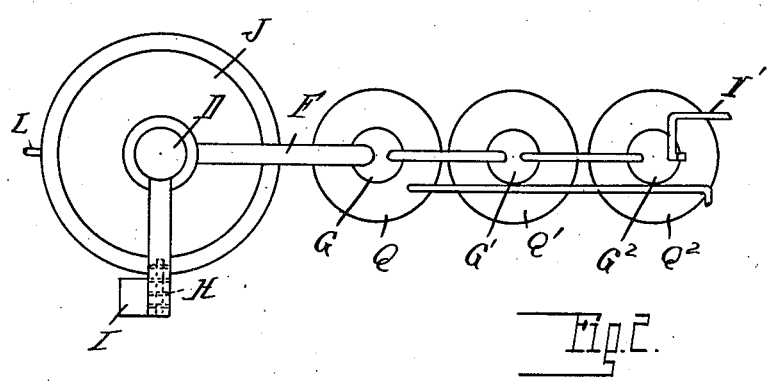
WITNESSES:
INVENTOR
Thomas Craney
BY
ATTORNEYS

UNITED STATES PATENT OFFICE.

THOMAS CRANEY, OF BAY CITY, MICHIGAN.

APPARATUS FOR THE PRODUCTION OF VALUABLE PRODUCTS FROM REFUSE ORGANIC MATTER.

1,140,502.          Specification of Letters Patent.     Patented May 25, 1915.

Application filed June 28, 1913. Serial No. 776,263.

*To all whom it may concern:*

Be it known that I, THOMAS CRANEY, a citizen of the United States of America, residing at Bay City, in the county of Bay and State of Michigan, have invented certain new and useful Improvements in Apparatus for the Production of Valuable Products from Refuse Organic Matter, of which the following is a specification, reference being had therein to the accompanying drawings.

The invention relates to the manufacture of products from refuse organic matter, such as garbage, sawdust, etc., and it is the object of the invention: first, to obtain a maximum of the more valuable by-products; second, to produce an effective incinerator for the destruction of the residuum and the generation of heat utilized in other parts of the process.

With these objects in view, the invention comprises the improved apparatus as hereinafter set forth.

In the drawings: Figure 1 is a diagrammatic side elevation partly in section of the apparatus; and Fig. 2 is a plan view thereof.

Refuse organic matter, such as garbage, in the condition in which it is collected contains a relatively large percentage of water, which must be driven off before the carbonaceous material can be burned in an incinerating plant. The driving off of the water vapor requires the expenditure of energy without the accomplishment of any useful result other than the drying of the material, but after a certain degree of dryness is attained, then destructive distillation will convert a portion of the material into valuable products. With my improved apparatus, I further increase the yield of valuable by-products by subjecting the refuse material to an initial fermentation treatment, by which ethyl alcohol and other fermentation products are produced. In the subsequent drying these volatile products are carried off and collected, being commingled with the products of destructive distillation, such as methyl alcohol, acetic acid, etc.

My apparatus is capable of use for the production of various specific products, but, as shown, and specifically described, the apparatus is designed for the production of alcohol, acetates and carbonates.

As shown, A is a furnace casing provided at its lower end with a suitable conical grate section B, from which the ash may be carried by a conveyer C. The material to be incinerated is fed into this furnace from the upper end thereof through a central conduit D, surrounding the upper part of which is a condensing chamber E communicating with a discharge conduit F leading to a series of condensers G G' $G^2$, etc. The inlet conduit D receives the material from a suitable conveyer H and elevator I, so that this material may be continuously fed downward in the center or vertical axis of the furnace. The distance down into the furnace which the conduit D extends may be varied according to the nature of the by-products desired, and for this purpose one or more telescopic extension sections D' and $D^2$ are attached to the lower end of the conduit D. J is a water jacket surrounding the chamber E and operating as a condenser for vapors impinging against the wall. K is an annular trough at the lower end of the chamber for collecting the condensate and for feeding the same through a conduit L to a chamber formed within a jacket M surrounding the main furnace chamber. This jacket has a vapor exit conduit N communicating with the vapor discharge conduit F, permitting the more volatile portions of the condensate to be re-vaporized and pass with the vapors in the conduit F.

The condensers G G' $G^2$ may be of any suitable construction, but preferably consist of an outer casing forming a water jacket and an inner casing for the condensate. The water is fed from one condenser to another in the opposite direction from the passage of the vapors, so that the coldest water enters the condenser $G^2$ from a conduit O, and then passes through a conduit O' to the condenser G', and from the latter through a conduit $O^2$ to the condenser G. From this condenser the water is passed through a conduit $O^3$ to the jacket J, and thus the warmest water is in this latter jacket. Each of the condensers is also provided with a discharge conduit P, from which the condensate is discharged into a storage tank Q.

In employing my improved apparatus as above described, I proceed as follows: The refuse material, such as garbage, is first permitted to stand for a certain length of time, during which period fermentation takes place. This may be stimulated by the introduction of some suitable ferment. The material is then fed either alone or commingled with other material, such as sawdust, through the conveyer H and elevator I to the conduit D, from which it passes downward into the interior of the furnace casing A. The adjustable end portions D' and D² of the conduit D are so positioned that the material when liberated therefrom will be at the desired height above the grate line. This will permit the hot gases generated in the zone of combustion to pass through the moist mass, carrying with them the volatile products, such as ethyl alcohol produced by the fermentation. This, together with the heavier tarry products are carried upward into the conical chamber, where the heavier constituents are condensed in contacting with the conical wall E, which is maintained at a relatively low temperature by the surrounding water jacket J. The condensate will pass down the conical wall in the trough K, from which it passes through the conduit L into the jacket M, where it is subjected to the heat at the lower portion of the furnace, and the more volatile portions are driven off through the conduit N.

The vapors and gases discharged from the furnace chamber through the conduit F are passed successively through the condensers G G' and G² which condense out different by-products. Thus the alcohols will be condensed in one of the condensers and collected in the associated storage tank, while the acetic acid will be condensed in another condenser, and in the same manner other products in still other condensers. The carbonic acid gas, being non-condensable at ordinary temperatures will pass through all of the tanks, and from the last of the series is discharged through the conduit Y' to suitable distillation apparatus (not shown).

All of the energy required for carrying out the process is furnished by the combustion of the residue after the volatiles have been driven off, and in case there is surplus heat, this may be utilized in the development of power.

By raising or lowering the extension portions D' and D² of the conduit D by means of the cables A' and A² passing over pulleys B' and B² respectively the character of the destructive distillation products may be varied, so that the same apparatus is capable of alternative use for the production of alcohols, acetates or other compounds. My apparatus may also be used for the production of turpentine from suitable materials, such as pine stumps or other woody fibrous material containing the turpentine. This material is fed into the furnace in the same manner as has been described, and the turpentine is driven off and collected in the condensers.

What I claim as my invention is:

1. An apparatus for the treatment of refuse organic matter, comprising a furnace having a closed upper end, an inlet conduit for the refuse material passing through said upper end, a vapor chamber surrounding said inlet conduit, a condenser surrounding said inlet chamber, a conduit for the passage of vapors from said vapor chamber above said condenser, and means for collecting the condensate in said chamber below said condenser.

2. An apparatus for the treatment of refuse organic matter, comprising a furnace having a chamber at the upper end thereof, an inlet conduit for the material passing axially through said chamber, a vapor and gas discharge conduit connecting with the upper end of said chamber, a condenser surrounding said chamber, means for collecting the condensate below said condenser, a chamber surrounding the furnace below said collecting means, and means for passing the distillate into said lower chamber to redistill the same.

3. In an apparatus for treating refuse organic matter, a furnace having an active combustion zone at the lower end thereof and a destructive distillation zone thereabove, an inner conduit passing downward through the upper end of the furnace, a condenser surrounding a portion above said destructive distillation zone, a collector for the condensate at the lower end of said condenser, a chamber surrounding the zone of active combustion, means for conducting the condensate into said chamber, and a vapor discharge conduit from said chamber and from the upper end of said furnace.

4. An apparatus for the treatment of organic matter, comprising a furnace, an inlet conduit for said matter extending downward through the top of said furnace, a surrounding chamber for condensing the gases and vapors, and means below said chamber for collecting the condensate.

In testimony whereof I affix my signature in presence of two witnesses.

THOMAS CRANEY.

Witnesses:
 JAMES P. BARRY,
 HENRI E. BOWMAN.